United States Patent [19]

Reimers et al.

[11] Patent Number: 4,853,208
[45] Date of Patent: Aug. 1, 1989

[54] METHOD OF BINDING WASTES IN ALKALINE SILICATE MATRIX

[75] Inventors: Robert S. Reimers, Metairie; Thomas G. Akers, New Orleans; C. Paul Lo, Destrehan, all of La.

[73] Assignee: Chemfix Technologies, Icc., Metairie, La.; Tulane Medical Center of Tulane University, New Orleans, La.

[21] Appl. No.: 170,543

[22] Filed: Mar. 21, 1988

[51] Int. Cl.$^4$ ............... C04B 28/26; C04B 35/16; C09D 1/02

[52] U.S. Cl. ................... 423/659; 106/74; 106/76; 106/77; 106/78; 106/89

[58] Field of Search ............ 106/74, 76, 85, 89, 106/90, 103; 423/659

[56] References Cited

U.S. PATENT DOCUMENTS

| | | | |
|---|---|---|---|
| 3,837,872 | 9/1974 | Conner | 106/76 |
| 4,053,401 | 10/1977 | Fukushima et al. | 210/52 |
| 4,116,705 | 9/1978 | Chappell | 106/90 |
| 4,226,630 | 10/1980 | Styron | 106/85 |
| 4,274,880 | 6/1981 | Chappell | 106/90 |
| 4,329,179 | 5/1982 | Kutta | 106/97 |
| 4,404,105 | 9/1983 | Lockerente et al. | 106/76 |
| 4,519,508 | 3/1985 | Connor | 106/76 |
| 4,600,514 | 7/1986 | Conner | 106/76 |
| 4,659,511 | 4/1987 | Fukasawa et al. | 106/97 |
| 4,687,373 | 8/1987 | Fack et al. | 106/74 |
| 4,737,356 | 4/1988 | O Hara | 423/659 |

FOREIGN PATENT DOCUMENTS 49-107993 10/1974 Japan .

OTHER PUBLICATIONS

Reimers et al., Proceedings of the 32nd Industrial Waste Conference, Purdue University, Lafayette, Indiana, May 10–12, 1977.

*Primary Examiner*—Gary P. Straub
*Attorney, Agent, or Firm*—Klarquist, Sparkman, Campbell

[57] ABSTRACT

A method of detoxifying hazardous wastes containing mercury, zinc, selenium, arsenic, antimony, or thallium by mixing the waste with silicate and a setting agent which together form an alkaline silicate matrix. An additive other than the silicate and setting agent is mixed with the waste, prior to the matrix setting, to form a complex with the mercury, zinc, selenium, arsenate, antimony, thallium, or copper that is substantially insoluble in the environment of the alkaline silicate matrix. The alkaline silicate matrix thereby binds wastes which could otherwise leach out to contaminate the environment.

46 Claims, No Drawings

METHOD OF BINDING WASTES IN ALKALINE SILICATE MATRIX

BACKGROUND OF THE INVENTION

1. Field of the Invention

This invention relates to treatment of toxic wastes, and more particularly, to treatment of such wastes containing heavy metals.

2. General Discussion of the Background

A heavy metal is a metal having a specific gravity greater than about 5.0. Examples of such metals are aluminum, cadmium, lead, cobalt, copper, thallium, zinc, antimony, chromium, nickel, and mercury. Arsenic and selenium are also classified as heavy metals by environmental regulatory agencies, although they are chemically classified as nonmetals. As used herein, the term heavy metals includes arsenic and selenium.

It is believed that almost 60% of the toxic wastes generated commercially in the United States each year are derived from primary metal or electroplating industries, which produce heavy metals. A major survey of four northeastern states has helped confirm this estimate by determining that heavy metal wastes constitute 41% of all hazardous wastes produced annually in those states. Greenberg & Anderson, "Hazardous Waste Sites: the Credibility Gap," The Center for Urban Policy Research, New Brunswick, New Jersey (1984), page 19.

Although heavy metals are a serious environmental contaminant, no economically feasible process exists for detoxifying them. Heavy metal wastes are typically immobilized by enclosing them in a container or altering their form, sometimes through solidification of the waste. Typical solidification processes include forming the waste into a ceramic or resin mixture, mixing the waste with industrial by-products such as dust or shale, or solidifying them with cement. *Hazardous Wastes Management Book*, Butterworth & Company, London (1985), page 149.

Typical cement based processes encapsulate waste in a solid matrix to physically encapsulate the waste without altering it chemically. Such cement based processes form an environment with a pH of about 9–10, which is a region of minimum solubility for metal hydroxides produced by encapsulation of the heavy metals within cement. The soluble metal hydroxides leach out of the cement matrix as the matrix is deteriorated by exposure to the environment. Cement encapsulation of wastes is therefore unsuitable for permanent disposal of toxic materials such as heavy metals.

Another waste product treatment process is disclosed in U.S. Pat. No. 3,837,872 which was reexamined and subsequently issued as reexamination Patent B1 3,837,872. The U.S. Pat. No. 3,837,872 process concerns treatment of sewage sludge and other wastes by chemical fixation and physical entrapment of pollutants within an alkaline silicate matrix. The waste is treated by mixing it with a setting agent and silicate, preferably in a waste to setting agent to silicate ratio of about 10:1:0.5 by volume. The resultant product is a friable, clay-like mass having a polymer lattice that entraps and reduces migration of toxic materials such as some metals and organics.

The U.S. Pat. No. 3,837,872 process is superior to mere physical encapsulation in a cement matrix because the silicate reactions of the U.S. Pat. No. 3,837,872 process chemically alter the waste in addition to physically encapsulating it within an alkaline silicate matrix. Unfortunately, many anionic and nonionic forms of metals are not retained within the alkaline silicate matrix. The silicate anions in the matrix are double trigonal and tetragonal rings of $(Si_6O_{15})^{-6}$, $(Si_8O_{20})^{-8}$, and $(Si_8O_{18}(OH)_2)^{-6}$. These silicate anions have an affinity for cations and do not chemically and physically entrap Pearson soft metals in the alkaline environment of the cement-silicate matrix formed by the treatment process.

Another common heavy metal pollutant is arsenic, which is produced in the flue dust of copper and lead smelters. Arsenic is highly toxic when ingested or inhaled and is a known carcinogen. In spite of these drawbacks, arsenic is widely used in manufacturing metals, semiconductors, and some medications. Other forms of arsenic include arsenate $(AsO_4)^{-3}$ and arsenite $(AsO_3)^{-3}$. Although elemental arsenic is immobilized in the cement-silicate matrix formed by the U.S. Pat. No. 3,837,872 process, the highly negatively charged arsenate and arsenite easily migrate in the cement-silicate matrix.

Another industrial pollutant is selenium. It is used in Xerographic plates, photocells, magnetic computer cores, solar batteries, ceramics, and other products. The cement-silicate matrix of the U.S. Pat. No. 3,837,872 process does not immobilize selenium.

It is accordingly an object of the present invention to provide a process for physically and chemically encapsulating heavy metals which are not already bound by an alkaline silicate matrix.

Another object is to provide a process which chemically alters and physically encapsulates heavy metals.

Yet another object is to provide an economically feasible process for rendering wastes nonpolluting, and which satisfies government regulations for the disposal of such wastes.

Even yet another object is to provide a method of waste treatment of heavy metals and arsenic which results in an environmentally nonhazardous product which can be used for economically beneficial purposes such as landfill.

Finally, it is an object of this invention to provide such a treatment process which can be performed on a continuous basis to treat large volumes of toxic waste containing heavy metals and arsenic.

SUMMARY OF THE INVENTION

The foregoing objects are achieved by mixing hazardous wastes containing heavy metals such as mercury, zinc, copper, selenium, arsenate, arsenite, antimony, or thallium with a setting agent, an additive and silicate to form an alkaline silicate matrix for chemically and physically entrapping the pollutants. Before the matrix sets, the waste is mixed with the additive, other than the silicate and setting agent, which forms a substantially insoluble complex with the heavy metal in the environment of the alkaline silicate matrix. The order of addition is preferably additive, cement, and then silicate.

In instances where the hazardous waste contains mercury or arsenite, the additive is preferably a mercaptan which reacts with the mercury to form a complex having a low solubility in the environment of the matrix. More preferably, the additive is a nonpolar mercaptan, such as one having an aliphatic carbon chain of at least eight carbons, or a branched carbon chain of at least six carbons. The additive preferably forms an uncharged complex in the environment of the matrix. In especially preferred embodiments, the additive is hexadecyl mercaptan, especially 4000 to 8000 ppm hexadecyl mercaptan, but less than 1% by weight.

Where the hazardous waste contains arsenate, the additive is preferably an amine or imine which reacts with the arsenate to form a complex having low solubility in the environment of the alkaline-silicate matrix. More preferably, the additive is a nonpolar amine or imine, such as one having an aliphatic carbon chain of at least eight carbons, or a branched carbon chain of at least six carbons. In especially preferred embodiments, the additive is an amine or imine such as PEI. In other embodiments, the additive is 0.5 to 1% by weight EDTA, up to 1% PVSA, or up to 1% PEI.

In wastes that contain zinc, the additive is preferably an imine or mercaptan which reacts with the zinc to form a complex having low solubility in the environment of the matrix. More preferably, the additive is a nonpolar imine or mercaptan, such as one having an aliphatic carbon chain of at least eight carbons, or a branched carbon chain of at least six carbons. In especially preferred embodiments, the additive is 1000 to 4000 ppm or up to 0.5% by weight of hexadecyl mercaptan, or 40,000 ppm or up to 5% by weight of PEI.

In wastes that contain thallium or antimony, the additive is preferably a mercaptan which reacts with thallium or antimony to form a complex having low solubility in the environment of the matrix. The additive is preferably a nonpolar mercaptan, such as one having an aliphatic carbon chain of at least eight carbons, or a branched carbon chain of at least six carbons. In especially preferred embodiments, the additive is hexadecyl mercaptan, most preferably 8000 ppm hexadecyl mercaptan, or 0.5 to 2% by weight.

In wastes that contain selenium, the additive is preferably a nonpolar mercaptan, such as an aliphatic carbon chain of at least eight carbons, or a branched carbon chain of at least six carbons. In especially preferred embodiments, the additive is hexadecyl mercaptan, and most preferably about 1000 ppm hexadecyl mercaptan, or 0.1% by weight.

When the waste contains copper, the additive is preferably a mercaptan which reacts with copper to form a complex having low solubility in the environment of the matrix. The additive is preferably a nonpolar mercaptan, or 100–2000 ppm mercaptoacetic acid, or up to 0.2% by weight.

The silicate is preferably an alkali metal silicate, while the setting agent is preferably selected from the group consisting of Portland cement, lime, gypsum, and calcium chloride.

The foregoing and other objects, features, and advantages of the invention will become more apparent from the following detailed description of several preferred embodiments.

DETAILED DESCRIPTION

The process disclosed in U.S. Pat. No. 3,837,872 (the disclosure of which is incorporated by reference) involves treating waste with a setting agent and silicate in a preferred volume ratio of about 10:1:0.5. In a preferred embodiment of the U.S. Pat. No. 3,837,872 method, sodium silicate and Portland cement are used as the silicate and setting agent, which produces a very alkaline environment in the treated waste. Typically, the pH of waste treated by this method is about pH 11.5–12.5. The combination and proportion of reagents are optimized for each particular waste treatment.

The U.S. Pat. No. 3,837,872 process employs a two part, inorganic chemical system which reacts with polyvalant metal ions, certain other waste components, and with itself to produce a chemically and physically stable solid material. This material contains a cross linked, three dimensional polymeric matrix and has good stability, a high melting point, and a rigid, friable texture similar to that of a clay soil.

Three classes of reactions occur after the waste is mixed with the silicate and setting agent. The first class of reactions is a rapid interaction between soluble silicates and some polyvalant metal ions which produces insoluble metal silicates. A second class of reactions occurs between the soluble silicates and the reactive components of the setting agent to produce a gel structure. A third class of reactions includes hydrolysis, hydration, and neutralization reactions between the setting agent and waste or water. As a result of these reactions, inorganic polymer chains form throughout the aqueous phase to physically entrap organic colloids within the micro structure of the silicate matrix.

The water soluble silicates react with complex cations in the presence of the silicious setting agent. Amorphous colloidal silicates are formed, and their chemical formula varies with pH, concentration of cations, and temperature. These properties vary as the reactions proceed, and various silicate anions in the form of double trigonal and tetragonal rings, such as $(Si_6O_{15})^{-6}$, $(Si_8O_{20})^{-8}$, and $(Si_8O_{18}(OH)_2)^{-6}$ are formed. $SiO_2$ also acts as a precipitating agent for metallic hydroxide precipitates which are developed within the physical structure of the matrix which is formed during the precipitation of amorphous colloids.

Most of the heavy metals, such as the Pearson hard metals, contained in the waste become part of the complex silicates by precipitating within the structure of the complex molecules. A small number of heavy metals and other pollutants, however, precipitate between the complex silicates and are not chemically immobilized. For example, wastes such as arsenate $(AsO_4)^{-3}$ and arsenite $(AsO_3)^{-3}$ migrate within the cement-silicate matrix, apparently because of the large negative charge of these waste constituents. the inability of the matrix to immobilize some of these heavy metals is illustrated in Example 1.

EXAMPLE 1

An electroplating sludge designated USEPA Hazardous Waste No. F006 was spiked with 1000 ppm of the following test compounds: cadmium, lead, copper, thallium, antimony, arsenic, selenium, silver, vanadium, zinc, barium, chromium, mercury, and nickel. The sludge was spiked with the amounts of the compounds shown in Table 1 to produce an elemental concentrate of 1000 ppm of the test compound:

TABLE 1

| Element | compound | Elemental concentrate (ppm) | Mass of Compound (g) |
|---|---|---|---|
| Cd | $Cd(NO_3)_2 4H_2O$ | 1000 | 2.76 |
| Pb | $Pb(NO_3)_2$ | 1000 | 1.60 |
| Ti | $Ti(NO_3)_3$ | 1000 | 1.91 |
| Sb | $Sb_2O_3$ | 1000 | 2.39 |
| Cu | $Cu(NO_3)_2 2.5H_2O$ | 1000 | 3.66 |
| Hg | $HgO$ | 1000 | 1.08 |
| Ag | $AgNO_3$ | 1000 | 1.575 |
| As | $NaAsO_2$ | 1000 | 1.74 |

TABLE 1-continued

| Element | compound | Elemental concentrate (ppm) | Mass of Compound (g) |
|---|---|---|---|
| Ni | Ni(NO$_3$)$_2$6H$_2$O | 1000 | 4.95 |
| Ba | Ba(NO$_3$)$_2$ | 1000 | 1.90 |
| Cr | Cr(NO$_3$)$_3$9H$_2$O | 1000 | 7.695 |
| Se | Se | 1000 | 1.00 |
| Zn | Zn | 1000 | 1.00 |
| V | V$_2$O$_5$ | 1000 | 1.785 |

These metals were dissolved in approximately 1 ml of water to enhance even distribution throughout the sludge. To decrease losses due to volatilization and sludge related reactions, the various additives were mixed just prior to fixation. All mixing was done with a Sunbeam electric blender on the high setting for approximately 30 seconds.

Solidification was performed using the CHEMFIX GIII formula in which a 100 g portion of sludge was blended with 12 g Portland cement, and then the blender was shut off. 3.0 ml of silicate was next added, and a final thorough blending took place with the mixer on a high setting for 30 seconds. Samples were left exposed to the air for 72 hours at room temperature to harden, during which time they solidified into a clay-like form. After this period of time, the samples were either capped to prevent evaporation and stored at room temperature or immediately extracted according to the TCLP (Toxicity Characteristic Leaching Procedure) procedure, set forth in *Federal Register*, Vol. 51, No. 9, at 1750 (Jan. 14, 1986). The retained leachate was digested prior to analysis by atomic absorption spectrophotometry. The analytical method was in accordance with *Standard Methods for the Analysis of Water and Waste Water*, 16th Ed., American Public Health Association (1985). The particular standard methods used for some of the respective wastes are listed below:

| | |
|---|---|
| 290A | Total Solids Dried at 103–105° C. |
| 308 | Barium |
| 310A | Cadmium |
| 312A | Chromium |
| 313A | Copper |
| 316A | Lead |
| 321A | Nickel |
| 323A | Selenium in Water |
| 324A | Silver |
| 327A | Vanadium |
| 328A | Zinc |
| 307A | Arsenic |

The arsenic, mercury, and selenium samples were digested separately according to *Procedures for Handling and Chemical Analysis of Sediment and Water Samples*, USEPA/Corps of Engineers Technical Committee (May 1981). The following procedures were used:

| | | |
|---|---|---|
| Mercury in Sediment | Cold Vapor Technique | 3-124 |
| Selenium in Sediment | Digestion/Flameless | |
| | Atomic Absorption | 3-131 |
| Mercury in Water | | 3-118 |

The results of the foregoing analysis are shown in the following Table 2:

TABLE 2

Waste Fixation in Alkaline Silicate Matrix Without Additive

| WASTE | TCLP OF SPIKED SLUDGE (mg/l) | TCLP OF PRODUCT W/O ADDITIVES (mg/l) | PERCENT IMPROVEMENT BY PROCESS (%) |
|---|---|---|---|
| Cadmium | 34.8 | 0.072 | 99.8 |
| Lead | 3.97 | 0.24 | 94.0 |
| Copper | 23.5 | 0.43 | 98.2 |
| Thallium | 13.5 | 12.4 | 8.2 |
| Antimony | 0.50 | 2.84 | No Improvement* |
| Arsenic | 1.57 | 1.23 | 21.7 |
| Selenium | 0.20 | 0.054 | No Improvement |
| Silver | 0.01 | 0.01 | No Improvement |
| Vanadium | <0.1 | 0.5 | No Improvement |
| Zinc | 158 | 0.265 | 99.8 |
| Barium | 0.8 | 1.1 | No Improvement |
| Chromium | 7.1 | <0.05 | 100 |
| Mercury | 2.07 | 2.12 | No Improvement |
| Nickel | 31.9 | 0.18 | 99.4 |

*The TCLP metal leachate from product was higher than the leachate from spiked sludge.

The TCLP value reported in Table 2 is the concentration of the waste in the leachate after the TCLP exposes the solidified cement-silicate matrix to conditions which approximate exposure to harsh environmental conditions for many years.

The results shown in Table 2 illustrate that the process was very effective in preventing five of the metals (cadmium, copper, zinc, chromium, and nickel) from leaching during a TCLP extraction. Lead was immobilized fairly well with a 94% reduction compared to leaching from untreated spiked sludge. The process had no effect, however, on binding thallium, silver, vanadium, mercury, barium, selenium, and antimony. Arsenic was not very effectively bound and showed only a 21.7% improvement compared to untreated spiked sludge. The effectiveness of the process in immobilizing wastes in the spiked sludge is summarized in the following Table 3:

TABLE 3

Effectiveness in Immobilization of Wastes Without Additives

| PERCENT IMPROVEMENT | TCLP OF PRODUCT | | | COMMENTS |
|---|---|---|---|---|
| | WASTE | CONC. (mg/l) | % | |
| >99% | Chromium | <0.05 | 100 | |
| | Cadmium | 0.07 | 99.8 | Very effective |
| | Zinc | 0.265 | 99.8 | |
| | Nickel | 0.18 | 99.4 | |
| >90%–99% | Copper | 0.43 | 98.2 | Very effective |
| >70%–90% | | | | |
| >50%–70% | | | | |
| >30%–50% | | | | |
| >10%–30% | Arsenic | 1.23 | 21.7 | No effect |
| 0%–10% | Thallium | 12.4 | 8.2 | No effect |
| | Silver | 0.01 | 0.0 | |
| | Vanadium | 0.50 | —* | |
| <0% | Mercury | 2.12 | — | Appears to release from matrix |
| | Barium | 1.10 | — | |
| | Selenium | 0.05 | — | |
| | Antimony | 2.84 | — | |

*Negative number.

EXAMPLE 2

The influence of hexadecyl mercaptan on retention of wastes in the cement-silicate matrix was shown by mixing the hexadecyl mercaptan in a blender for 30 seconds with the amounts of cement and silicate in Example 1 before the mixture hardened. Analysis of each sample was performed as in Example 1, and the TCLP of the produce with the hexadecyl mercaptan additive was determined. The TCLP of the product with the hexadecyl mercaptan additive was compared to the TCLP obtained in Example 1 and reported in Table 2 where no additives were used. Table 4 summarizes the results of the TCLP with the hexadecyl mercaptan additive:

TABLE 4

Influence of Hexadecxyl Mercaptan (HM) on Waste Fixation

| WASTE | TCLP OF SPIKED SLUDGE (mg/l) | TCLP OF PRODUCT W/O ADDITIVES (mg/l) | TCLP OF PRODUCT WITH HM ADDITIVE (mg/l) | | | | |
|---|---|---|---|---|---|---|---|
|  |  |  | 500 ppm | 1000 ppm | 2000 ppm | 4000 ppm | 8000 ppm |
| Cadmium | 34.8 | 0.072 | 0.081 | 0.068 | 0.084 | 0.073 | 0.074 |
| Lead | 3.97 | 0.24 | 0.24 | 0.27 | 0.31 | 0.20 | 0.30 |
| Copper | 23.5 | 0.43 | 0.59 | 0.30 | 0.35 | 0.18 | 0.11 |
| Thallium | 13.5 | 12.4 | 15.8 | 10.7 | 10.3 | 7.5 | 5.9 |
| Antimony | 0.50 | 2.84 | 7.20 | 2.82 | 2.10 | 1.43 | 1.31 |
| Arsenic | 1.57 | 1.23 | NA* | 3.04 | 3.76 | 1.68 | 2.28 |
| Selenium | 0.20 | 0.054 | NA | 0.020 | 0.085 | 0.410 | 0.066 |
| Silver | 0.01 | 0.01 | NA | 0.02 | 0.06 | 0.07 | 0.02 |
| Vanadium | <0.1 | 0.5 | NA | 0.5 | 0.5 | 0.5 | 0.5 |
| Zinc | 158 | 0.265 | NA | 0.062 | 0.062 | 0.052 | 0.054 |
| Barium | 0.8 | 1.1 | NA | 1.1 | 0.9 | 0.9 | 0.9 |
| Chromium | 7.1 | <0.05 | NA | <0.05 | <0.05 | <0.05 | <0.05 |
| Mercury | 2.07 | 2.12 | NA | 2.40 | 0.47 | 0.0015 | 0.0006 |
| Nickel | 31.9 | 0.18 | NA | 0.16 | 0.19 | 0.19 | 0.19 |

*NA: Not Analyzed.

Although hexadecyl mercaptan improved immobilization within the alkaline silicate matrix of several wastes such as thallium, antimony, selenium, and zinc, the greatest improvement was seen in immobilizing mercury. When used at concentrations of 4000 and 8000 ppm, the matrix retained over 99% of the mercury leached from spiked sludge alone. There was a 99.93% improvement in binding mercury at 4000 ppm, and a 99.97% improvement at 8000 ppm. Although the alkaline silicate matrix is of an oxidal nature with a low affinity for Pearson soft metals such as mercury, the addition of hexadecyl mercaptan immobilized mercury.

There was a 50-70% improvement in binding thallium, antimony, and selenium, and a 70-90% improvement in binding zinc.

The sixteen carbon aliphatic chain of hexadecyl mercaptan makes it a nonpolar additive which forms a substantially insoluble complex in the alkaline silicate matrix. The insolubility of the nonpolar, long chain, hydrophobic hexadecyl mercaptan complex is illustrated by comparing it to soluble complexes that would be formed if sort chain, polar, hydrophilic additives such as methyl mercury sulfide complexes were formed. Examples of methyl mercury sulfide complexes are $CH_3HgS^-$, $(CH_3Hg)_2S$, and $(CH_3Hg)_3S^+$. These complexes are known to migrate easily within an alkaline silicate matrix and would not be substantially insoluble.

Generally any mercaptan, with an aliphatic carbon chain of at least eight carbons or a branched chain of at least six carbons will be form a substantially insoluble complex in the alkaline silicate matrix. Examples of mercaptans other than hexadecyl mercaptan that will form insoluble complexes include:

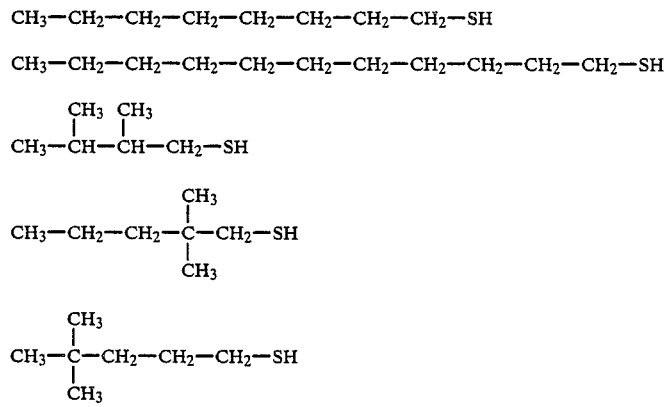

EXAMPLE 3

The influence of polyethylene imine (PEI) on heavy metal fixation was shown by using the cement-silicate treatment method of Example 1 and mixing PEI, in the amounts shown in Table 5, with the cement-silicate slurry before solidification of the matrix:

TABLE 5
Influence of Polyethylene Imine (PEI) on Waste Fixation

| WASTE | TCLP OF SPIKED SLUDGE (mg/l) | TCLP OF PRODUCT W/O ADDITIVES (mg/l) | TCLP OF PRODUCT WITH PEI ADDITIVE (mg/l) | | | |
|---|---|---|---|---|---|---|
| | | | 6250 ppm | 12500 ppm | 25000 ppm | 40000 ppm |
| Cadmium | 34.8 | 0.072 | 0.090 | 0.089 | 0.950 | 0.080 |
| Lead | 3.97 | 0.24 | 0.26 | 0.24 | 0.27 | 0.30 |
| Copper | 23.5 | 0.43 | 0.64 | 1.04 | 1.94 | 1.22 |
| Thallium | 13.5 | 12.4 | 14.3 | 14.2 | 14.9 | 15.8 |
| Antimony | 0.50 | 2.84 | 4.90 | 7.80 | 6.20 | 2.81 |
| Arsenic | 1.57 | 1.23 | NA* | NA | NA | 0.33 |
| Selenium | 0.020 | 0.054 | NA | NA | NA | 0.71 |
| Silver | 0.01 | 0.01 | NA | NA | NA | 0.03 |
| Zinc | 158 | 0.265 | NA | NA | NA | 0.082 |
| Barium | 0.8 | 1.1 | NA | NA | NA | 1.4 |
| Mercury | 2.07 | 2.12 | NA | NA | NA | 6.90 |
| Nickel | 31.9 | 0.18 | NA | NA | NA | 0.24 |

*NA: Not Analyzed.

PEI at 40,000 ppm was found to improve immobilization within the matrix of arsenic (in the form of arsenate) and zinc 70 to 80% compared to the treatment of Example 1 without the PEI additive. The long polymeric, nonpolar chain of carbons in PEI apparently reduces the solubility of the complex formed between the PEI and waste, which substantially immobilizes the complex within the alkaline matrix.

The porphyrin type structure of the EDTA apparently results in the low solubility of the complex formed by the EDTA and arsenate in the alkaline silicate matrix. Generally, any nonpolar amine, such as one having an aliphatic carbon chain of at least eight carbons, or a branched chain of at least six carbons, will form an insoluble complex with arsenate in the alkaline silicate matrix.

Examples of such amines include:

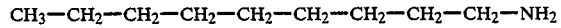

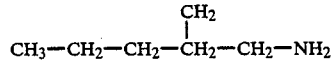

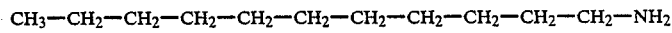

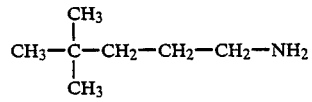

EXAMPLE 4

The influence of ethylenediamine tetraacetate (EDTA) on heavy metal fixation in the alkaline silicate matrix was shown by treating spiked sludge with the fixation process of Example 1 and an EDTA additive in the amounts shown in the following Table 6:

EXAMPLE 5

The influence of polyvinyl sulfonic acid (PVSA) on heavy metal fixation was determined by treating the spiked sludge of Example 1 with the fixation method described in that example. The fixation process of Ex-

TABLE 6
Influence of Ethylenediamine Tetraacetate (EDTA) on Waste Fixation

| WASTE | TCLP OF SPIKED SLUDGE (mg/l) | TCLP OF PRODUCT W/O ADDITIVES (mg/l) | TCLP OF PRODUCT WITH EDTA ADDITIVE (mg/l) | | | | | |
|---|---|---|---|---|---|---|---|---|
| | | | 100 ppm | 300 ppm | 500 ppm | 1000 ppm | 2000 ppm | 5000 ppm |
| Cadmium | 34.8 | 0.072 | 0.036 | 0.077 | 1.44 | 2.16 | 4.35 | 8.85 |
| Lead | 3.97 | 0.24 | 0.30 | 0.40 | 0.40 | 0.50 | 0.82 | 2.00 |
| Copper | 23.5 | 0.43 | 0.66 | 0.87 | 1.17 | 1.65 | 2.49 | 6.56 |
| Thallium | 13.5 | 12.4 | 12.4 | 11.9 | 13.4 | 12.4 | 13.5 | 12.0 |
| Antimony | 0.50 | 2.84 | 4.00 | 3.12 | 3.01 | 3.12 | 3.13 | 3.24 |
| Arsenic | 1.57 | 1.23 | 0.067 | 0.074 | 0.063 | 0.069 | 0.057 | 0.016 |

EDTA at 5000 ppm improved binding of arsenic (in the form of arsenate) within the alkaline-silicate matrix by over 98%.

ample 1 was modified, however, by additing polyvinyl sulfonic acid (PVSA) in the amounts shown in the following Table 7:

TABLE 7

Influence of Polyvinyl Sulfonic Acid on Waste Fixation

| WASTE | TCLP OF SPIKED SLUDGE (mg/l) | TCLP OF PRODUCT W/O ADDITIVES (mg/l) | TCLP OF PRODUCT WITH PVSA ADDITIVE (mg/l) | | | | |
|---|---|---|---|---|---|---|---|
| | | | 500 ppm | 1000 ppm | 2000 ppm | 4000 ppm | 8000 ppm |
| Cadmium | 34.8 | 0.072 | 0.078 | 0.068 | 0.073 | 0.068 | 0.074 |
| Lead | 3.97 | 0.24 | 0.28 | 0.40 | 0.27 | 0.30 | 0.20 |
| Copper | 23.5 | 0.43 | 0.54 | 0.64 | 0.49 | 0.54 | 0.54 |
| Thallium | 13.5 | 12.4 | 15.8 | 9.4 | 11.3 | 9.8 | 9.8 |
| Antimony | 0.50 | 2.84 | 4.41 | 4.42 | 3.60 | 3.90 | 3.90 |
| Arsenic | 1.57 | 1.23 | NA* | 0.076 | 0.068 | 0.091 | 0.088 |

*NA: Not Analyzed.

Moderate improvement was seen in binding thallium at 4000–8000 ppm and arsenic (in the form of arsenate) at 1000–8000 ppm in the alkaline-silicate matrix.

The long, polymeric, nonpolar carbon chain of the PVSA apparently reduces the solubility of the complex formed between the thallium and arsenate in the alkaline silicate matrix.

EXAMPLE 6

The influence of mercaptoacetic acid (MAA) on heavy metal fixation was shown by treating spiked sludge with the treatment process of claim 1 and adding MAA in the amounts shown in the following Table 8:

TABLE 8

Influence of Mercaptoacetic Acid (MAA) on Waste Fixation

| WASTE | TCLP OF SPIKED SLUDGE (mg/l) | TCLP OF PRODUCT W/O ADDITIVES (mg/l) | TCLP OF PRODUCT WITH MAA ADDITIVE (mg/l) | | | | |
|---|---|---|---|---|---|---|---|
| | | | 100 ppm | 300 ppm | 500 ppm | 1000 ppm | 2000 ppm |
| Cadmium | 34.8 | 0.072 | NA* | NA | 0.077 | 0.069 | 0.084 |
| Lead | 3.97 | 0.24 | NA | NA | 0.27 | 0.32 | 0.29 |
| Copper | 23.5 | 0.43 | 0.15 | 0.19 | 0.13 | 0.27 | 0.13 |
| Thallium | 13.5 | 12.4 | NA | NA | 14.7 | 12.5 | 16.7 |
| Antimony | 0.50 | 2.84 | NA | NA | 6.33 | 5.60 | 6.50 |
| Arsenic | 1.57 | 1.23 | NA | NA | 0.076 | NA | NA |

*NA: Not Analyzed.

Moderate improvement in binding copper was observed at 100–2000 ppm MAA. Some improvement in binding arsenic was also seen at 500 ppm MAA.

EXAMPLE 7

The influence of triethylene tetramine (TETA) on heavy metal fixation was determined by treating spiked sludge with the treatment process of claim 1 and adding TETA in the amounts shown in the following Table 9:

TABLE 9

Influence of Triethylene Tetramine (TETA) on Waste Fixation

| WASTE | TCLP OF SPIKED SLUDGE (mg/l) | TCLP OF PRODUCT W/O ADDITIVES (mg/l) | TCLP OF PRODUCT WITH TETA ADDITIVE (mg/l) | | | |
|---|---|---|---|---|---|---|
| | | | 100 ppm | 300 ppm | 500 ppm | 1000 ppm |
| Cadmium | 34.8 | 0.072 | 0.082 | 0.084 | 0.064 | 0.079 |
| Lead | 3.97 | 0.24 | 0.30 | 0.60 | 0.29 | 0.34 |
| Copper | 23.5 | 0.43 | 12.4 | 33.8 | 31.5 | 65.2 |
| Thallium | 13.5 | 12.4 | 17.2 | 17.7 | 14.8 | 14.9 |
| Antimony | 0.50 | 2.84 | 4.31 | 5.30 | 3.73 | 3.90 |

No improvement was seen in any of the spiked sludges for the wastes tested.

The effect of additives for heavy metal fixation in the alkaline silicate matrix are summarized in the following Table 10:

TABLE 10

Summary of Effective Additives

| METALS | TCLP OF CHEMFIX RPODUCT (mg/l) | >90% IMPROVEMENT* | | | >70%-90% IMPROVEMENT* | | | >50%-70% IMPROVEMENT* | | |
|---|---|---|---|---|---|---|---|---|---|---|
| | | Additives | (mg/l) | % | Additives | (mg/l) | % | Additives | (mg/l) | % |
| Copper | 0.43 | | | | AC (10,000–40,000 ppm) | 0.10 | 76.7 | MAA (100–2,000 ppm) | 0.14 | 67.4 |
| Thallium | 12.4 | | | | | | | HM (8,000 ppm) | 5.9 | 52.5 |
| Antimony | 2.84 | | | | | | | HM (8,000 ppm) | 1.3 | 54.2 |

TABLE 10-continued

| | | Summary of Effective Additives | | | | | | | |
|---|---|---|---|---|---|---|---|---|---|
| | TCLP OF CHEMFIX RPODUCT | >90% IMPROVEMENT* | | | >70%-90% IMPROVEMENT* | | | >50%-70% IMPROVEMENT* | | |
| METALS | (mg/l) | Additives | (mg/l) | % | Additives | (mg/l) | % | Additives | (mg/l) | % |
| Arsenic | 1.23 | EDTA (5,000 ppm) | 0.016 | 98.7 | PEI (40,000 ppm) | 0.33 | 73.2 | | | |
| Selenium | 0.05 | | | | | | | HM (1,000 ppm) | 0.02 | 60.0 |
| Zinc | 0.265 | | | | HM (1,000-4,000 ppm) | 0.055 | 79.6 | | | |
| | | | | | PEI (40,000 ppm) | 0.08 | 70.4 | | | |
| Mercury | 2.12 | HM (4,000-8,000 ppm) | 0.001 | 99.9 | | | | | | |

The percent improvement shown in Table 10 is the comparison of the TCLP leachate concentrations for the product with and without additives. PEI is polyethylene amine: HM is hexadecyl mercaptan; and EDTA is ethylenediamine tetraacetate.

Formation of Insoluble Complexes

The additives of the present invention immobilize heavy metals by forming an insoluble complex in the alkaline silicate matrix. The inventors believe, without being bound by theory, that the following classes of reactions occur with mercaptans, amines, and imines to form insoluble complexes within the alkaline silicate matrix:

Some mercaptans react with mercury, selenium, zinc, antimony, and thallium as follows:

$$Y-M^+ + HS-R \rightarrow H^+ + Y-M-S-R$$

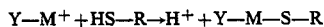

where Y is covalently bound to the metal M before the slurry setting agent and silicate are mixed with the additive; R is the group attached to the mercaptan to reduce solubility of the mercaptan; and Y—M—S—R is the substantially insoluble complex which is immobilized within the matrix.

If M is Hg, for example, the formation of the insoluble complex would occur as follows:

$$H_2O \cdot HgO + HSR \rightarrow H^+ + H_2O \cdot HgO-S-R$$

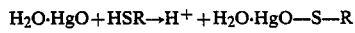

where R is a nonpolar, hydrophobic, or otherwise insoluble group in the alkaline silicate environment.

Arsenate reacts with some amines to form insoluble complexes as shown in the following equations:

$$Y-M^+ + NH_2-R \rightarrow H^+ + Y-M-NHR$$

where Y is covalently bound to the metal M before the slurry, setting agent, and silicate are mixed with the additive; R is the group attached to the amine to reduce solubility of the amine; and Y—M—NHR is the substantially insoluble complex which is immobilized within the alkaline silicate matrix.

Arsenate and zinc react with some imines to form insoluble complexes as shown in the following equations:

$$Y-M^+ + CNHR \rightarrow H^+ + Y-M-N-CHR$$

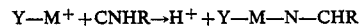

Having illustrated and described the principles of the invention in several examples, it should be apparent to those skilled in the art that the invention can be modified in arrangement and detail without departing from such principles. We claim all modifications coming within the spirit and scope of the following claims.

We claim:

1. A method of reducing the leachability of hazardous wastes containing mercury, selenium, arsenate, antimony, or thallium, comprising the steps of:
   forming a silicate matrix by mixing the waste with alkali metal silicate and a setting agent selected from the group consisting of cement, lime, gypsum, and calcium chloride which sets the matrix;
   prior to setting, mixing the waste with an additive other than the silicate and setting agent, the additive being selected from the group consisting of amines, imines, mercaptans, ethylene diammine tetraacetic acid, and polyvinyl sulfonic acid, which forms a complex with mercury, selenium, arsenate, antimony, or thallium, the complex having a lower leachability in the environment of the silicate matrix than that of a matrix without the additive when both are contacted with a leaching solution under the same conditions.

2. The method of claim 1 wherein the hazardous waste contains mercury and the additive is a mercaptan which reacts with the mercury to form a complex having said lower leachability in the environment of the matrix.

3. The method of claim 2 wherein the additive is a mercaptan with an aliphatic carbon chain of at least eight carbons.

4. The method of claim 2 wherein the additive is a mercaptan with a branched carbon chain of at least six carbons.

5. The method of claim 2 wherein the additive is a nonpolar mercaptan.

6. The method of claim 2 wherein the additive is a mercaptan which forms an uncharged complex in the environment of the matrix.

7. The method of claim 2 wherein the additive is hexadecyl mercaptan.

8. The method of claim 7 wherein the additive is about 4000-8000 ppm hexadecyl mercaptan.

9. The method of claim 7 wherein the additive is up to 1% by weight hexadecyl mercaptan.

10. The method of claim 1 wherein the hazardous waste contains arsenate and the additive is selected from the group consisting of a non-polar amine or imine, ethylene diammine tetraacetic acid (EDTA), and polyvinyl sulfonic acid (PVSA) which reacts with the arsenate to form a complex having said lower leachability in the environment of the matrix.

11. The method of claim 10 wherein the additive is a nonpolar amine or imine.

12. The method of claim 10 wherein the additive is EDTA.

13. The method of claim 12 wherein the additive is about 5000 ppm EDTA.

14. The method of claim 12 wherein the additive is about 0.5 to 1% by weight EDTA.

15. The method of claim 10 wherein the additive is polyethylene imine (PEI).

16. The method of claim 15 wherein the additive is about 40,000 ppm polyethylene imine (PEI).

17. The method of claim 10 wherein the additive is PVSA.

18. The method of claim 17 wherein the additive is less than about 1% by weight PVSA.

19. The method of claim 1 wherein the hazardous waste contains thallium or antimony, and the additive is a mercaptan which reacts with thallium or antimony to form a complex having said lower solubility in the environment of the matrix.

20. The method of claim 19 wherein the additive is hexadecyl mercaptan.

21. The method of claim 20 wherein the additive is about 8000 ppm hexadecyl mercaptan.

22. The method of claim 20 wherein the additive is about 0.5 to 2.0% hexadecyl mercaptan.

23. The method of claim 1 wherein the waste contains selenium, and the additive is a mercaptan which reacts with selenium to form a complex having said lower solubility in the environment of the matrix.

24. The method of claim 23 wherein the additive is hexadecyl mercaptan.

25. The method of claim 24 wherein the additive is about 1000 ppm hexadecyl mercaptan.

26. The method of claim 1 wherein the silicate is sodium silicate.

27. The method of claim 1 wherein the setting agent is Portland cement.

28. The method of claim 1 wherein the pH of the alkaline silicate matrix is about 11.5–12.5.

29. The method of claim 1 wherein the waste, silicate and setting agent are mixed in a volume of about 10:1:0.5.

30. The method of claim 29 wherein the setting agent is Portland cement and the silicate is sodium silicate.

31. The method of claim 1 wherein the silicate, setting agent and waste are mixed in sufficient proportions such that the mixture dries to a friable, clay-like material.

32. A method of reducing the leachability of hazardous waste which contains zinc, comprising the steps of forming a silicate matrix by mixing the waste with alkali metal silicate and a setting agent selected from the group consisting of cement, lime, gypsum and calcium chloride which sets the matrix, and prior to setting, mixing the waste with an additive selected from the group consisting of an imine or mercaptan which reacts with zinc to form a complex having a lower leachability in the environment of the silicate matrix than that of a matrix without the additive when both are contacted with a leaching solution under the same conditions.

33. The method of claim 32 wherein the additive is polyethylene imine (PEI).

34. The method of claim 33 wherein the additive is about 40,000 ppm PEI.

35. The method of claim 33 wherein the additive is less than 7% PEI.

36. The method of claim 32 wherein the additive is a mercaptan.

37. The method of claim 36 wherein the additive is hexadecyl mercaptan.

38. The method of claim 37 wherein the additive is about 1000–4000 ppm hexadecyl mercaptan.

39. The method of claim 37 wherein the additive is less than 0.5% hexadecyl mercaptan.

40. A method of reducing the leachability of hazardous wastes containing mercury, selenium, antimony or thallium, comprising the steps of:
    forming a silicate matrix by mixing the waste with alkali metal silicate and a setting agent selected from the group consisting of cement, lime, gypsum, and calcium chloride which sets the matrix;
    prior to setting, mixing the waste with an additive other than the silicate and the setting agent selected from the group consisting of mercaptans and polyvinyl sulfonic acid which forms a complex with mercury, selenium, antimony or thallium, the complex having a lower leachability in the environment of the silicate matrix than that of a matrix without the additive when both are contacted with a leaching solution under the same conditions.

41. The method of claim 40 wherein the additive is a mercaptan which reacts with mercury, selenium, antimony or thallium in the environment of the matrix.

42. The method of claim 41 wherein the additive is a mercaptan with an aliphatic carbon chain of at least eight carbons.

43. The method of claim 41 wherein the additive is a mercaptan with a branched carbon chain of at least six carbons.

44. The method of claim 41 wherein the additive is a non-polar mercaptan.

45. The method of claim 41 wherein the additive is hexadecyl mercaptan.

46. The method of claim 40 wherein the waste is thallium and the additive is polyvinyl sulfonic acid.

* * * * *

UNITED STATES PATENT AND TRADEMARK OFFICE
CERTIFICATE OF CORRECTION

PATENT NO. : 4,853,208

DATED : August 1, 1989

INVENTOR(S) : Robert S. Reimers, Thomas F. Akers and C. Paul Lo

It is certified that error appears in the above-identified patent and that said Letters Patent is hereby corrected as shown below: Title page:

Pertaining to Field #73 the Assignee should read Chemfix Technologies, Inc.

In the Specification:
Column 5, line 43, "290A" should be --209A--.
Column 6, table 3, ">70%-90%" should be -->70%-90%    Lead    0.24    94.0--.
Column 7, line 9, "produce" should be --product--.
Column 7, table 4, "Selenium    0.20" should be --Selenium    0.020--.
Column 9, table 6, "Cadmium    0.036" should be --Cadmium 0.36--.
Column 10, line 66, "additing" should be --adding--.
Column 14, line 28, the word --and-- should be inserted after the word "matrix;".
Column 16, line 29, the word --and-- should be inserted after the word "matrix;".

Signed and Sealed this

Twenty-seventh Day of November, 1990

Attest:

HARRY F. MANBECK, JR.

*Attesting Officer*      *Commissioner of Patents and Trademarks*